US011077778B2

(12) United States Patent
Miller et al.

(10) Patent No.: US 11,077,778 B2
(45) Date of Patent: Aug. 3, 2021

(54) OFFSET DUAL PAWL ARMREST LATCH

(71) Applicant: GM Global Technology Operations LLC, Detroit, MI (US)

(72) Inventors: Scott K. Miller, Southfield, MI (US); Thomas D. Hallman, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 109 days.

(21) Appl. No.: 16/531,939

(22) Filed: Aug. 5, 2019

(65) Prior Publication Data
US 2021/0039535 A1    Feb. 11, 2021

(51) Int. Cl.
*B60R 7/04*    (2006.01)
*B60N 2/75*    (2018.01)

(52) U.S. Cl.
CPC ............... *B60N 2/793* (2018.02); *B60R 7/04* (2013.01)

(58) Field of Classification Search
CPC ... B60R 7/04; B60R 2011/0007; B60N 2/793; B60N 2/79; E05B 63/04; E05B 63/14; E05B 63/22; E05B 83/30; E05C 9/04
USPC ....... 296/24.34; 292/4–8, 26, 48, 29, 30, 35, 292/36, 52, 53, 66, 85, 86, 117–119, 166, 292/167, DIG. 7
See application file for complete search history.

(56) References Cited

U.S. PATENT DOCUMENTS

| 4,601,515 | A | * | 7/1986 | Hatsutta | B60N 2/0228 297/362.12 |
| 5,472,246 | A | * | 12/1995 | Puric | E05B 63/0017 292/156 |
| 5,931,336 | A | * | 8/1999 | Takeuchi | B60R 7/04 220/836 |
| 6,142,333 | A | * | 11/2000 | Sasamoto | B60R 7/04 220/264 |
| 6,176,385 | B1 | * | 1/2001 | Feese | B60R 7/04 220/326 |
| 6,278,676 | B1 | * | 8/2001 | Anderson | B60R 7/04 296/37.8 |
| 10,596,973 | B2 | * | 3/2020 | Yamazaki | E05D 11/1014 |
| 10,794,097 | B2 | * | 10/2020 | Ruzich | E05C 9/04 |
| 2004/0168487 | A1 | * | 9/2004 | Sawatani | B60R 7/06 70/145 |
| 2004/0201238 | A1 | * | 10/2004 | Griggs, Jr. | E05B 77/06 296/24.34 |
| 2004/0256859 | A1 | * | 12/2004 | Yamada | E05B 83/30 292/32 |
| 2005/0199664 | A1 | * | 9/2005 | Perl | B60R 11/0241 224/282 |

(Continued)

*Primary Examiner* — Kyle J. Walraed-Sullivan

(57) ABSTRACT

A latch assembly for a compartment of a vehicle interior is provided. The latch assembly comprises a frame, a first pawl member, a second pawl member, a lever member, and a resilient member. The frame has a first portion, a second portion, and a third portion. The frame is fixed to a cover of the compartment. The first pawl member is slidingly disposed in the first portion of the frame. The second pawl member is slidingly disposed in the second portion of the frame. The lever member has a first and a second pivot pin and a center hub. The center hub is rotatably supported by the third portion of the frame. The first pivot pin is disposed in the first pivot slot of the first pawl member. The second pivot pin is disposed in the second pivot slot of the second pawl member.

19 Claims, 3 Drawing Sheets

(56) References Cited

U.S. PATENT DOCUMENTS

| | | | |
|---|---|---|---|
| 2009/0066102 A1* | 3/2009 | Shiono | B60R 7/04 296/24.34 |
| 2009/0206625 A1* | 8/2009 | Toppani | E05B 13/10 296/37.12 |
| 2009/0212586 A1* | 8/2009 | Blanck | B60R 7/04 296/37.8 |
| 2009/0218361 A1* | 9/2009 | Dammers | E05D 15/502 220/817 |
| 2011/0068598 A1* | 3/2011 | Penner | E05B 83/32 296/37.8 |
| 2012/0001447 A1* | 1/2012 | Simon | E05B 77/06 296/24.34 |
| 2013/0038097 A1* | 2/2013 | Oldani | B60N 3/105 297/188.14 |
| 2013/0057011 A1* | 3/2013 | Yamagishi | B60R 7/04 296/24.34 |
| 2013/0127199 A1* | 5/2013 | Mildner | B60R 7/04 296/24.34 |
| 2013/0153447 A1* | 6/2013 | Cinco | B60N 2/773 206/216 |
| 2013/0193707 A1* | 8/2013 | Bouldron | B60R 7/06 296/37.8 |
| 2014/0008921 A1* | 1/2014 | Shimizu | E05C 21/00 292/156 |
| 2016/0001683 A1* | 1/2016 | Bohlke | B60N 2/797 297/378.1 |
| 2016/0001684 A1* | 1/2016 | An | B60N 2/763 296/37.5 |
| 2016/0003275 A1* | 1/2016 | An | B60N 2/793 403/322.4 |
| 2016/0121767 A1* | 5/2016 | Dyle | B60N 2/753 296/37.8 |
| 2016/0229603 A1* | 8/2016 | Amick | B60N 3/102 |
| 2016/0339848 A1* | 11/2016 | Hodgson | B60R 11/00 |
| 2016/0340942 A1* | 11/2016 | Anderson | B60R 7/04 |
| 2017/0029116 A1* | 2/2017 | Veneruso | B64D 11/0646 |
| 2017/0054320 A1* | 2/2017 | Yamanishi | H02J 7/027 |
| 2018/0009387 A1* | 1/2018 | Kwon | B60N 2/773 |
| 2018/0022281 A1* | 1/2018 | Hatakeyama | E05D 7/10 220/811 |
| 2018/0154815 A1* | 6/2018 | Karges | B60N 3/10 |
| 2019/0077322 A1* | 3/2019 | Ike | B60N 2/793 |
| 2020/0002978 A1* | 1/2020 | Ketels | B60K 37/06 |
| 2020/0002979 A1* | 1/2020 | Ketels | B60K 37/06 |
| 2020/0130594 A1* | 4/2020 | Park | B60R 7/06 |
| 2020/0131813 A1* | 4/2020 | Wiepen | E05B 83/30 |
| 2020/0156552 A1* | 5/2020 | Yoshida | B60R 7/04 |
| 2020/0291696 A1* | 9/2020 | Seki | B60R 7/04 |

* cited by examiner

OFFSET DUAL PAWL ARMREST LATCH

INTRODUCTION

The present disclosure relates generally to a latch mechanism of a hinged cover for a vehicle compartment and more particularly to a latch mechanism for an armrest cover of a center console for a vehicle.

Interior vehicle designs are constantly improving the experience of driving and riding in the vehicle. In one such manner, interior vehicle designs are making functional elements of the vehicle more ergonomic while maintaining or improving the same performance specifications for the particular component. In one example, an interior vehicle compartment must remain closed while the vehicle is in motion or comes to a sudden stop. Therefore, designers and engineers must work in concert to develop mechanisms that maintain standards while adapting to new designs.

Accordingly, there is a need for new interior compartment having an adaptable latch mechanism for a vehicle having an improved ergonomic, functional, and aesthetic design while maintain performance standards.

SUMMARY

A latch assembly for a compartment of a vehicle interior is provided. The latch assembly comprises a frame, a first pawl member, a second pawl member, a lever member, and a resilient member. The frame has a first portion, a second portion, and a third portion. The frame is fixed to a cover of the compartment. The first pawl member has a first pawl, a button, and a first pivot slot. The first pawl member is slidingly disposed in the first portion of the frame. The second pawl member has a second pawl, and a second pivot slot. The second pawl member is slidingly disposed in the second portion of the frame. The lever member has a first and a second pivot pin and a center hub. The center hub is rotatably supported by the third portion of the frame. The first pivot pin is disposed in the first pivot slot of the first pawl member. The second pivot pin is disposed in the second pivot slot of the second pawl member. The resilient member is disposed between the lever member and the frame. The resilient member urges the lever member to a first position relative to the frame.

In one example of the present disclosure, the third portion of the frame has a first end and a second end opposite the first end. The first portion of the frame extends at a first angle from the first end of the third portion of the frame and the second portion of the frame extends at a second angle from the second end of the third portion of the frame.

In another example of the present disclosure, the first and second angles are approximately 90°.

In yet another example of the present disclosure, the first portion of the frame extends in a first direction from the third portion of the frame. The second portion of the frame extends in a second direction from the third portion of the frame. The first direction is opposite the second direction.

In yet another example of the present disclosure, the first pawl member further has a first end, a second end opposite the first end, and a center section. The button of the first pawl member is disposed on the first end of the first pawl member. The first pivot slot of the first pawl member is disposed proximate the second end of the first pawl member. The first pawl of the first pawl member extends from the center section of the first pawl member.

In yet another example of the present disclosure, the second pawl member further has a first end, a second end opposite the first end, and a center section. The second pawl of the second pawl member extends from the first end of the second pawl member. The second pivot slot is disposed proximate the second end of the second pawl member.

In yet another example of the present disclosure, the lever member further has a first arm and a second arm. The first arm having a first end and a second end opposite the first end. The first end of the first arm extends from a first edge of the center hub. The first pivot pin is disposed proximate the second end of the first arm. The second arm having a first end and a second end opposite the first end. The first end of the second arm extends from a second edge of the center hub opposite the first edge. The second pivot pin is disposed proximate the second end of the second arm.

In yet another example of the present disclosure, the first arm and the second arm of the lever member are equal length.

In yet another example of the present disclosure, the first and second pawls extend into a retention feature of the compartment to selectively retain the cover to the compartment.

Another latch assembly for a compartment of a vehicle interior is provided. The latch assembly comprises a frame, a first pawl member, a second pawl member, a lever member, and a resilient member. The frame has a first portion, a second portion, and a third portion. The frame is fixed to a cover of the compartment. The third portion of the frame has a first end and a second end opposite the first end. The first portion of the frame extends at a first angle from the first end of the third portion of the frame and the second portion of the frame extends at a second angle from the second end of the third portion of the frame.

The first pawl member has a first end, a second end opposite the first end, a first pawl, a button, and a first pivot slot. The first pawl member is slidingly disposed in the first portion of the frame, the button of the first pawl member is disposed on the first end of the first pawl member. The first pivot slot of the first pawl member is disposed proximate the second end of the first pawl member. The first pawl of the first pawl member extends from the center section of the first pawl member.

The second pawl member has a first end, a second end opposite the first end, a center section, a second pawl, and a second pivot slot. The second pawl member is slidingly disposed in the second portion of the frame. The second pawl of the second pawl member extends from the first end of the second pawl member. The second pivot slot is disposed proximate the second end of the second pawl member.

The lever member has a first and a second pivot pin and a center hub. The center hub is rotatably supported by the third portion of the frame. The first pivot pin is disposed in the first pivot slot of the first pawl member. The second pivot pin is disposed in the second pivot slot of the second pawl member.

The resilient member is disposed between the lever member and the frame. The resilient member urges the lever member to a first position relative to the frame.

In one example of the present disclosure, the first and second angles of the frame are approximately 90°.

In another example of the present disclosure, the first portion of the frame extends in a first direction from the third portion of the frame. The second portion of the frame extends in a second direction from the third portion of the frame. The first direction is opposite the second direction.

In yet another example of the present disclosure, the lever member further has a first arm and a second arm. The first arm having a first end and a second end opposite the first end. The first end of the first arm extends from a first edge of the center hub. The first pivot pin is disposed proximate the second end of the first arm. The second arm having a first end and a second end opposite the first end. The first end of the second arm extends from a second edge of the center hub opposite the first edge. The second pivot pin is disposed proximate the second end of the second arm.

In yet another example of the present disclosure, the first arm and the second arm of the lever member are equal length.

In yet another example of the present disclosure, the first and second pawls extend into a retention feature of the compartment to selectively retain the cover to the compartment.

A center console for a vehicle is provided. The center console comprises a compartment, an armrest cover, and a hinge. The compartment has an interior surface forming a first, a second, a third, and a fourth walls, and wherein the compartment is fixed to the floor of the vehicle. The armrest cover assembly has a first end, a second end opposite the first end, and a latch assembly. The hinge is disposed on the first end of the armrest cover assembly and a top edge of the first wall of the compartment.

In one example of the present disclosure, the latch assembly comprises a frame, a first pawl member, a second pawl member, a lever member, and a resilient member. The frame has a first portion, a second portion, and a third portion. The frame is fixed to the armrest cover assembly. The third portion of the frame has a first end and a second end opposite the first end. The first portion of the frame extends at a first angle from the first end of the third portion of the frame and the second portion of the frame extends at a second angle from the second end of the third portion of the frame.

The first pawl member has a first end, a second end opposite the first end, a first pawl, a button, and a first pivot slot. The first pawl member is slidingly disposed in the first portion of the frame. The button of the first pawl member is disposed on the first end of the first pawl member. The first pivot slot of the first pawl member is disposed proximate the second end of the first pawl member. The first pawl of the first pawl member extends from the center section of the first pawl member.

The second pawl member has a first end, a second end opposite the first end, a center section, a second pawl, and a second pivot slot. The second pawl member is slidingly disposed in the second portion of the frame. The second pawl of the second pawl member extends from the first end of the second pawl member. The second pivot slot is disposed proximate the second end of the second pawl member.

The lever member has a first and a second pivot pin and a center hub. The center hub is rotatably supported by the third portion of the frame. The first pivot pin is disposed in the first pivot slot of the first pawl member. The second pivot pin is disposed in the second pivot slot of the second pawl member.

The resilient member is disposed between the lever member and the frame. The resilient member urges the lever member to a first position relative to the frame.

In one example of the present disclosure, the first and second angles of the frame are approximately 90°. The first portion of the frame extends in a first direction from the third portion of the frame. The second portion of the frame extends in a second direction from the third portion of the frame. The first direction is opposite the second direction.

In another example of the present disclosure, the lever member further has a first arm and a second arm. The first arm and the second arm of the lever member are equal length. The first arm having a first end and a second end opposite the first end. The first end of the first arm extends from a first edge of the center hub. The first pivot pin is disposed proximate the second end of the first arm. The second arm having a first end and a second end opposite the first end. The first end of the second arm extends from a second edge of the center hub opposite the first edge. The second pivot pin is disposed proximate the second end of the second arm.

In yet another example of the present disclosure, the first and second pawls extend into a retention feature of the compartment to selectively retain the armrest cover assembly to the compartment.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

The following description is merely exemplary in nature and is not intended to limit the present disclosure, application, or uses. The terms "about", "approximately", and "proximate" as used in the description is defined as an amount or location around a specific number or closer to an element that does not have a significant impact on the results or the operation of an element.

Figure 1:
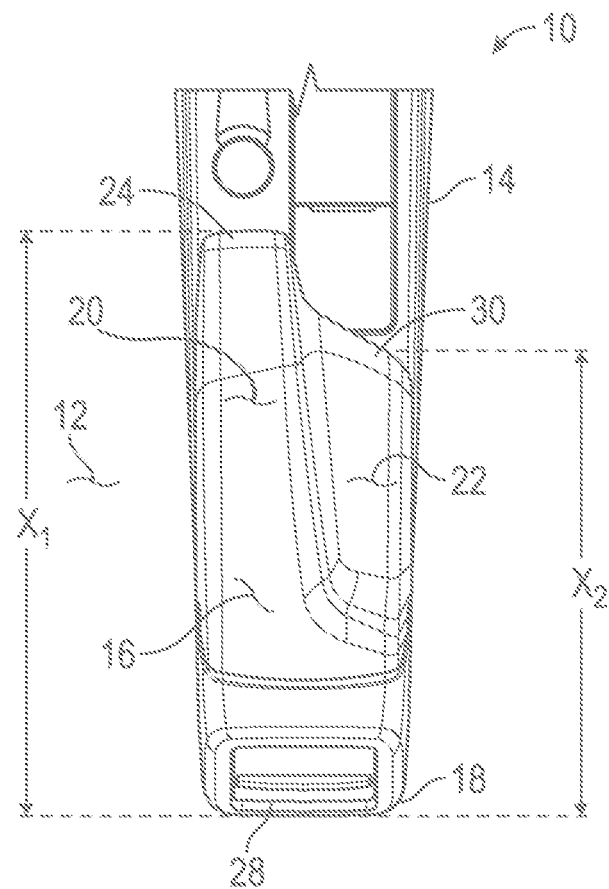
FIG. 1 is a plan view of a center console according to the principles of the present disclosure.
Figure 2:
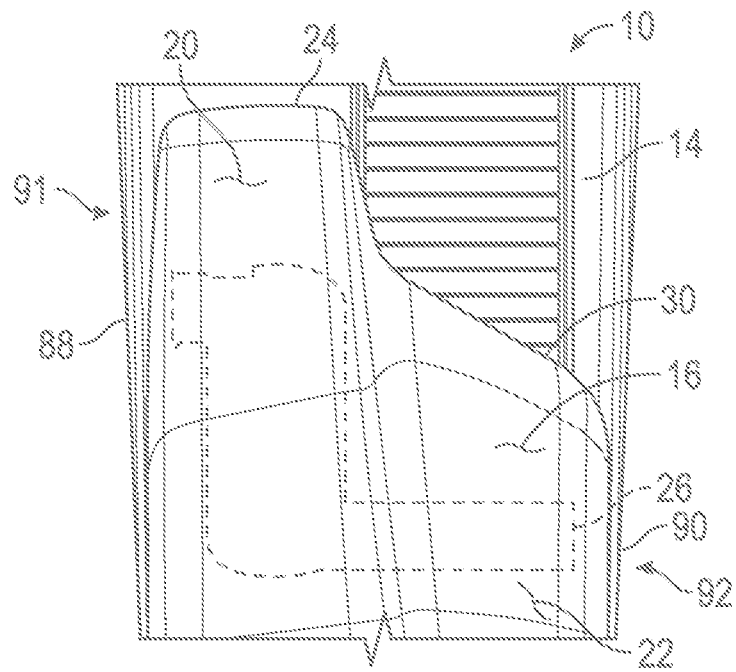
FIG. 2 is a plan view of a center console showing a latch mechanism according to the principles of the present disclosure.

With reference to FIGS. 1 and 2, a center console 10 for a vehicle is illustrated and will now be described. The center console 10 is fixed to the floor 12 of the vehicle between the front or rear passenger seats (not shown) However, the center console 10 may be placed in other locations in the vehicle without departing from the scope of the present disclosure. Additionally, mechanisms described herein may be incorporated into other locations of the vehicle without departing from the scope of the disclosure. For example, the mechanisms may be incorporated into a stowage console in the cargo area of a sport utility vehicle or other vehicle.

The center console 10 includes a compartment 14 and an armrest cover 16. The compartment 14 is fixed to the floor 12 of the vehicle. The armrest cover 16 includes a first end 18, a first top surface 20, a second top surface 22, a second end 24, and a latch assembly 26. The first end 18 of the armrest cover 16 includes a hinge 28 that is fastened to each of the first end 18 of the armrest cover 16 and the top edge of the compartment 14. The first top surface 20 extends from the first end 18 to the second end 24 of the armrest cover 16. The second top surface 22 extends from the first end 18 of the armrest cover 16 and terminates to an edge 30 of the armrest cover 16. Thus, the first top surface 20 extends beyond the termination of the second top surface 22. The result is a first distance $X_1$ between the first end 18 and the second end 24 of the armrest cover 16 is greater than a second distance $X_2$ between the first end 18 and the edge 30 of the armrest cover 16.

Figure 3:
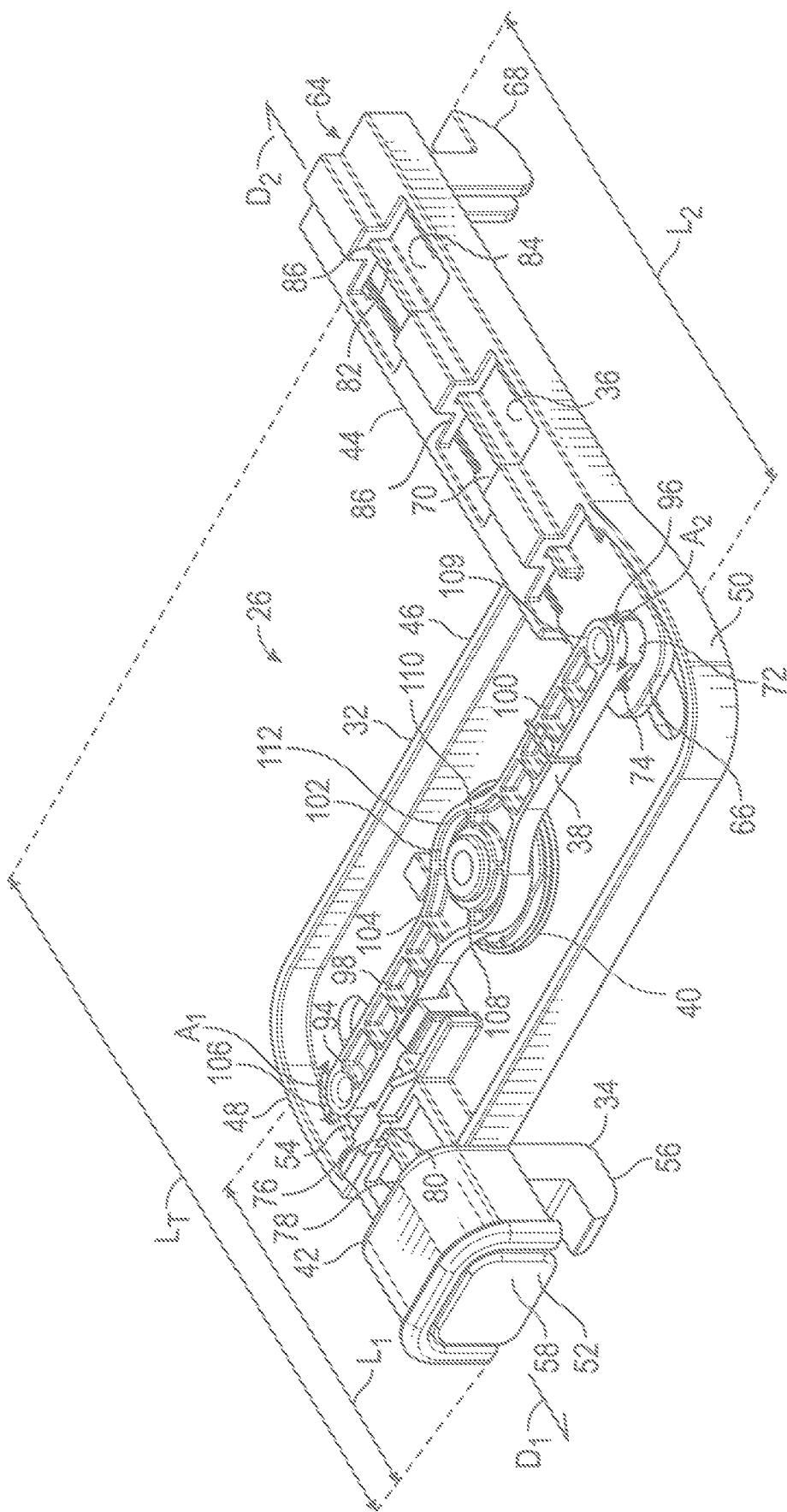
FIG. 3 is a perspective view of a latch mechanism for a center console according to the principles of the present disclosure.
Figure 3A:
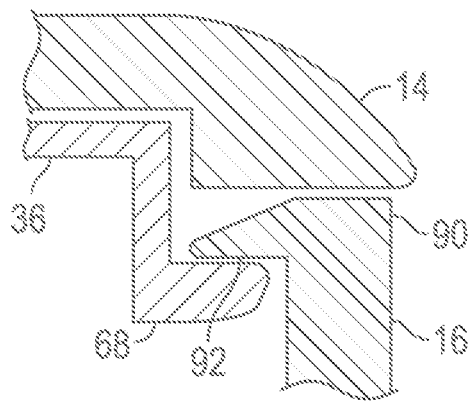
FIG. 3A is a cross-section of a portion of a latch mechanism for a center console according to the principles of the present disclosure.

The latch assembly 26 of the armrest cover 16 is disposed on the interior of the armrest cover 26. Turning now to FIGS. 3 and 3A, the latch assembly 26 includes a frame 32, a first pawl member 34, a second pawl member 36, a lever member 38 and a resilient member or spring 40. More particularly, the frame 32 includes a first portion 42, a second portion 44, and a third portion 46. The first portion 42 extends in a first direction $D_1$ from a first end 48 of the third portion 46 at a first angle $A_1$. The second portion 44 of the frame 32 extends in a second direction $D_2$ from a second end 50 of the third portion 46 at a second angle $A_2$. For the purpose of the present disclosure, the first direction $D_1$ is opposite the second direction $D_2$. Additionally, the first angle $A_1$ and second angle $A_2$ are approximately 90°.

The first pawl member 34 is slidingly disposed predominantly in the first portion 42 of the frame 32 and includes a first end 52 and a second end 54 and includes the features of a first pawl 56, a button 58 and a first pivot slot 60. The button 58 is formed in the first end 52 of the first pawl member 34. The first pawl 56 extends below the center portion of the first pawl member 34. The first pivot slot 60 (shown more clearly in FIGS. 4 and 5) is formed from an inner surface 62 proximate the second end 54 of the first pawl member 34.

The second pawl member 36 is slidingly disposed predominantly in the second portion 44 of the frame 32 and includes a first end 64 and a second end 66 and includes the features of a second pawl 68, an elongated center section 70, and a second pivot slot 72. The second pawl 68 extends below the first end 64 of the second pawl member 36. The second pivot slot 60 (shown more clearly in FIGS. 4 and 5) is formed from an inner surface 74 proximate the second end 66 of the second pawl member 36.

Each of the first pawl member 34 and the second pawl member 36 are capable of translational movement in the first and second directions $D_1$, $D_2$. The first pawl member 34 also includes a first ridge 76 formed on the top surface 78 along the length of the first pawl member 34. The first ridge 76 is received by a first groove 80 formed in the first portion 42 of the frame 32. The combination of the first ridge 76 and the first groove 80 provides stability in the translational movement of the first pawl member 34 relative to the frame 32.

The second pawl member 36 also includes a second ridge 82 formed on the top surface 84 along the length of the first pawl member 34. The second ridge 82 is received by a second groove 86 formed in the second portion 44 of the frame 32. The combination of the second ridge 82 and the second groove 86 provides stability in the translational movement of the second pawl member 36 relative to the frame 32.

Due to the design of the armrest cover 26, the lengths of the first and second pawl members 34, 36 are not equal. For example, the first length $L_1$ of the first pawl member 34 is less than the second length $L_2$ of the second pawl member 36. However, the total length $L_T$ is sufficient such that the first pawl 56 of the first pawl member 34 interacts with a first side wall 88 of the compartment 14 and the second pawl 68 of the second pawl member 36 interacts with a second side wall 90 of the compartment 14. The compartment 14 also includes a first and a second retention feature 91, 92. As shown more clearly in FIG. 3A, when the elements of the latch assembly 26 are in a first position, the first retention feature 91 receives the first pawl 56 of the first pawl member 34 and the second retention feature 92 receives the second pawl 68 of the second pawl member 36. In this regard, the armrest cover 16 is retained to the compartment 14 when the latch assembly 26 is in the first position.

The lever member 38 has a first pivot pin 94, a second pivot pin 96, a first arm 98, a second arm 100, and a center hub 102. More particularly, the first arm 98 has a first end 104 and a second end 106 opposite the first end 104. The first end 104 of the first arm 98 extends from a first edge 108 of the center hub 102. The first pivot pin 94 is disposed proximate the second end 106 of the first arm 98. Likewise, the second arm 100 has a first end 109 and a second end 110 opposite the first end 109, the first end 109 of the second arm 100 extends from a second edge 112 of the center hub 102 opposite the first edge 108. The second pivot pin 96 is disposed proximate the second end 110 of the second arm 100. The center hub 102 is rotatably supported by the third portion 46 of the frame 32. The first pivot pin 94 is disposed in the first pivot slot 60 of the first pawl member 34 and the second pivot pin 96 is disposed in the second pivot slot 72 of the second pawl member 36. For the purpose of keeping the translation of the first and second pawl members 34, 36 equal, the length of the first arm 98 is equal to the length of the second arm 100.

Figure 4:
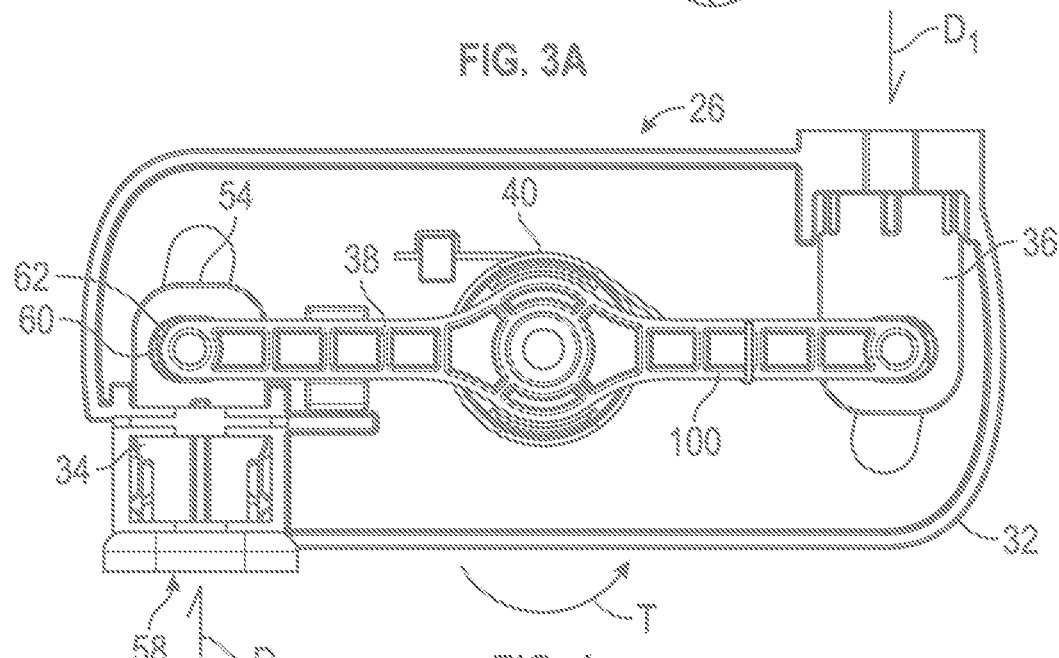
FIG. 4 is a plan view of a portion of a latch mechanism for a center console according to the principles of the present disclosure.
Figure 5:
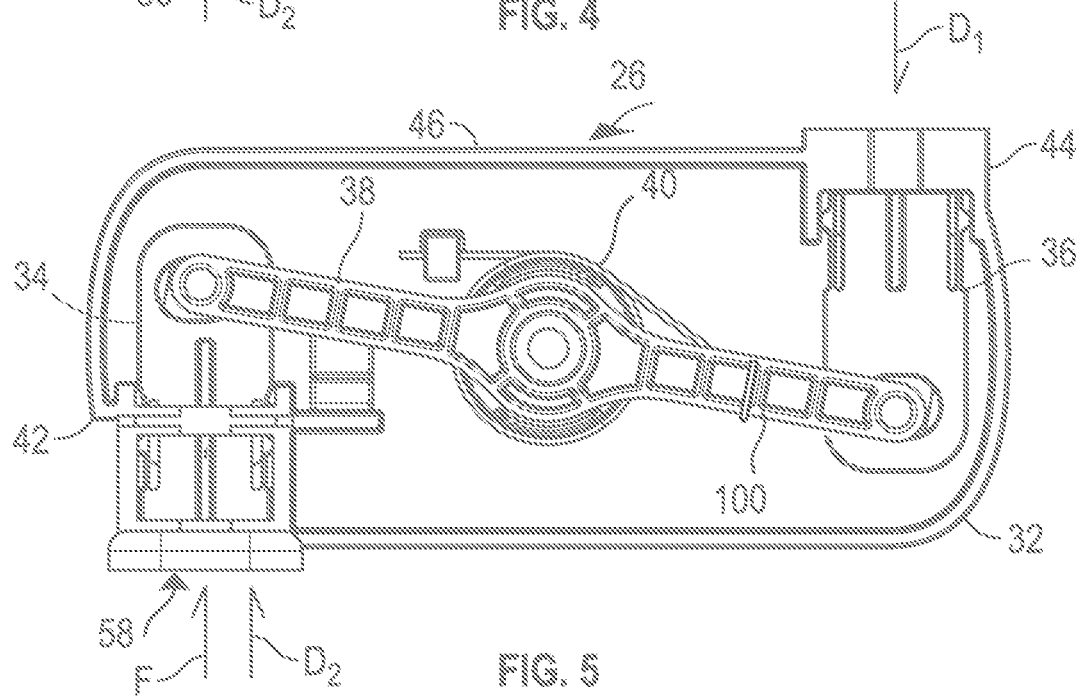
FIG. 5 is a plan view of a portion of a latch mechanism for a center console according to the principles of the present disclosure.

Turning now to FIGS. 4 and 5, the latch assembly 26 is illustrated in each of a first position (FIG. 4) and a second position (FIG. 5). In the first position, the spring 40 applies a torsional force T to the second arm 100 of the lever member 38 so that the latch assembly 26 is at rest in the first position which maintains the armrest cover 16 on top of the compartment 14. In the second position, a force F is applied to the button 58 of the first pawl member 34, translating the first pawl member 34 in the second direction $D_2$ which in turn rotates the lever member 38 and translates the second pawl member 36 in the first direction $D_1$. This action releases the armrest cover 16 from the compartment 14 allowing the armrest cover 16 to rotate upward via the hinge 28.

While examples have been described in detail, those familiar with the art to which this disclosure relates will recognize various alternative designs and examples for practicing the disclosed structure within the scope of the appended claims.

The following is claimed:

1. A latch assembly for a compartment of a vehicle interior, the latch assembly comprising:
   a frame having a first portion, a second portion, and a third portion, and wherein the frame is fixed to a cover of the compartment, the third portion of the frame has a first end and a second end opposite the first end, the first portion of the frame extends at a first angle from the first end of the third portion of the frame and the second portion of the frame extends at a second angle from the second end of the third portion of the frame;
   a first pawl member having a first end, a second end opposite the first end, a first pawl, a button, and a first pivot slot, and wherein the first pawl member is slidingly disposed in the first portion of the frame, the button of the first pawl member is disposed on the first end of the first pawl member, the first pivot slot of the first pawl member is disposed proximate the second end of the first pawl member, and the first pawl of the first pawl member extends from a center section of the first pawl member;

a second pawl member having a first end, a second end opposite the first end, a center section, a second pawl, and a second pivot slot, and wherein the second pawl member is slidingly disposed in the second portion of the frame, the second pawl of the second pawl member extends from the first end of the second pawl member, and the second pivot slot is disposed proximate the second end of the second pawl member;

a lever member having a first and a second pivot pin and a center hub, and wherein the center hub is rotatably supported by the third portion of the frame, the first pivot pin is disposed in the first pivot slot of the first pawl member, and the second pivot pin is disposed in the second pivot slot of the second pawl member; and a resilient member disposed between the lever member and the frame, and wherein the resilient member urges the lever member to a first position relative to the frame.

2. The latch assembly of claim 1 wherein the third portion of the frame has a first end and a second end opposite the first end, the first portion of the frame extends at a first angle from the first end of the third portion of the frame and the second portion of the frame extends at a second angle from the second end of the third portion of the frame.

3. The latch assembly of claim 2 wherein the first and second angles are approximately 90°.

4. The latch assembly of claim 3 wherein the first portion of the frame extends in a first direction from the third portion of the frame, the second portion of the frame extends in a second direction from the third portion of the frame, and the first direction is opposite the second direction.

5. The latch assembly of claim 1 wherein the first pawl member further has a first end, a second end opposite the first end, and a center section, the button of the first pawl member is disposed on the first end of the first pawl member, the first pivot slot of the first pawl member is disposed proximate the second end of the first pawl member, and the first pawl of the first pawl member extends from the center section of the first pawl member.

6. The latch assembly of claim 1 wherein the second pawl member further has a first end, a second end opposite the first end, and a center section, the second pawl of the second pawl member extends from the first end of the second pawl member, and the second pivot slot is disposed proximate the second end of the second pawl member.

7. The latch assembly of claim 1 wherein the lever member further has a first arm and a second arm, the first arm having a first end and a second end opposite the first end, the first end of the first arm extends from a first edge of the center hub, the first pivot pin is disposed proximate the second end of the first arm, the second arm having a first end and a second end opposite the first end, the first end of the second arm extends from a second edge of the center hub opposite the first edge, and the second pivot pin is disposed proximate the second end of the second arm.

8. The latch assembly of claim 7 wherein the first arm and the second arm of the lever member are equal length.

9. The latch assembly of claim 1 wherein the first and second pawls extend into a retention feature of the compartment to selectively retain the cover to the compartment.

10. A latch assembly for a compartment of a vehicle interior, the latch assembly comprising:

a frame having a first portion, a second portion, and a third portion, and wherein the frame is fixed to a cover of the compartment, the third portion of the frame has a first end and a second end opposite the first end, the first portion of the frame extends at a first angle from the first end of the third portion of the frame and the second portion of the frame extends at a second angle from the second end of the third portion of the frame;

a first pawl member having a first end, a second end opposite the first end, a first pawl, a button, and a first pivot slot, and wherein the first pawl member is slidingly disposed in the first portion of the frame, the button of the first pawl member is disposed on the first end of the first pawl member, the first pivot slot of the first pawl member is disposed proximate the second end of the first pawl member, and the first pawl of the first pawl member extends from a center section of the first pawl member;

a second pawl member having a first end, a second end opposite the first end, a center section, a second pawl, and a second pivot slot, and wherein the second pawl member is slidingly disposed in the second portion of the frame, the second pawl of the second pawl member extends from the first end of the second pawl member, and the second pivot slot is disposed proximate the second end of the second pawl member;

a lever member having a first and a second pivot pin and a center hub, and wherein the center hub is rotatably supported by the third portion of the frame, the first pivot pin is disposed in the first pivot slot of the first pawl member, and the second pivot pin is disposed in the second pivot slot of the second pawl member; and a resilient member disposed between the lever member and the frame, and wherein the resilient member urges the lever member to a first position relative to the frame.

11. The latch assembly of claim 10 wherein the first angle and the second angle of the frame are approximately 90°.

12. The latch assembly of claim 11 wherein the first portion of the frame extends in a first direction from the third portion of the frame, the second portion of the frame extends in a second direction from the third portion of the frame, and the first direction is opposite the second direction.

13. The latch assembly of claim 12 wherein the lever member further has a first arm and a second arm, the first arm having a first end and a second end opposite the first end, the first end of the first arm extends from a first edge of the center hub, the first pivot pin is disposed proximate the second end of the first arm, the second arm having a first end and a second end opposite the first end, the first end of the second arm extends from a second edge of the center hub opposite the first edge, the second pivot pin is disposed proximate the second end of the second arm.

14. The latch assembly of claim 13 wherein the first arm and the second arm of the lever member are equal length.

15. The latch assembly of claim 14 wherein the first pawl and the second pawl extend into a retention feature of the compartment to selectively retain the cover to the compartment.

16. A center console for a vehicle, the center console comprising:

a compartment having an interior surface forming a first, a second, a third, and a fourth walls, and wherein the compartment is fixed to a floor of the vehicle;

an armrest cover assembly having a first end, a second end opposite the first end, and a latch assembly;

a hinge disposed on the first end of the armrest cover assembly and a top edge of the first wall of the compartment;

wherein the latch assembly comprises:

a frame having a first portion, a second portion, and a third portion, and wherein the frame is fixed to the armrest cover assembly, the third portion of the frame has a first end and a second end opposite the first end, the first portion of the frame extends at a first angle from the first end of the third portion of the frame and the second portion of the frame extends at a second angle from the second end of the third portion of the frame;

a first pawl member having a first end, a second end opposite the first end, a first pawl, a button, and a first pivot slot, and wherein the first pawl member is slidingly disposed in the first portion of the frame, the button of the first pawl member is disposed on the first end of the first pawl member, the first pivot slot of the first pawl member is disposed proximate the second end of the first pawl member, and the first pawl of the first pawl member extends from a center section of the first pawl member;

a second pawl member having a first end, a second end opposite the first end, a center section, a second pawl, and a second pivot slot, and wherein the second pawl member is slidingly disposed in the second portion of the frame, the second pawl of the second pawl member extends from the first end of the second pawl member, and the second pivot slot is disposed proximate the second end of the second pawl member;

a lever member having a first and a second pivot pin and a center hub, and wherein the center hub is rotatably supported by the third portion of the frame, the first pivot pin is disposed in the first pivot slot of the first pawl member, and the second pivot pin is disposed in the second pivot slot of the second pawl member; and a resilient member disposed between the lever member and the frame, and wherein the resilient member urges the lever member to a first position relative to the frame.

17. The center console of claim 16 wherein the first angle and the second angle of the frame are approximately 90 and the first portion of the frame extends in a first direction from the third portion of the frame, the second portion of the frame extends in a second direction from the third portion of the frame, and the first direction is opposite the second direction.

18. The center console of claim 17 wherein the lever member further has a first arm and a second arm, the first arm and the second arm of the lever member are equal length, the first arm having a first end and a second end opposite the first end, the first end of the first arm extends from a first edge of the center hub, the first pivot pin is disposed proximate the second end of the first arm, the second arm having a first end and a second end opposite the first end, the first end of the second arm extends from a second edge of the center hub opposite the first edge, the second pivot pin is disposed proximate the second end of the second arm.

19. The center console of claim 18 wherein the first and second pawls extend into a retention feature of the compartment to selectively retain the armrest cover assembly to the compartment.

* * * * *